US008947292B2

(12) United States Patent
Andersson et al.

(10) Patent No.: US 8,947,292 B2
(45) Date of Patent: Feb. 3, 2015

(54) RADAR SYSTEM AND METHOD FOR A SYNTHETIC APERTURE RADAR

(75) Inventors: Lars-Gunnar Andersson, Lindome (SE); Hans Hellsten, Linköping (SE)

(73) Assignee: SAAB AB, Linköping (SE)

( * ) Notice: Subject to any disclaimer, the term of this patent is extended or adjusted under 35 U.S.C. 154(b) by 849 days.

(21) Appl. No.: 13/148,328

(22) PCT Filed: Feb. 6, 2009

(86) PCT No.: PCT/SE2009/050128
§ 371 (c)(1),
(2), (4) Date: Jan. 12, 2012

(87) PCT Pub. No.: WO2010/090564
PCT Pub. Date: Aug. 12, 2010

(65) Prior Publication Data
US 2012/0105274 A1    May 3, 2012

(51) Int. Cl.
*G01S 13/00*   (2006.01)
*G01S 13/90*   (2006.01)

(52) U.S. Cl.
CPC ......... *G01S 13/90* (2013.01); *G01S 2013/9041* (2013.01)
USPC .... 342/25 R; 342/25 A; 342/25 B; 342/25 C; 342/25 D; 342/25 E; 342/25 F

(58) Field of Classification Search
CPC ........................................ G01S 13/90–13/9094
USPC ....... 342/25 R, 25 A, 25 B, 25 C, 25 D, 25 E, 342/25 F, 118, 120, 128–132, 175
See application file for complete search history.

(56) References Cited

U.S. PATENT DOCUMENTS 3,594,795 A * 7/1971 Thor et al. .................... 342/201
3,714,653 A * 1/1973 Thor et al. .................... 342/201
(Continued)

FOREIGN PATENT DOCUMENTS

WO    WO-2006057583 A1    6/2006

OTHER PUBLICATIONS

PCT/ISA/210—International Search Report—Sep. 28, 2009.
(Continued)

*Primary Examiner* — Peter Bythrow
(74) *Attorney, Agent, or Firm* — Venable LLP; Eric J. Franklin

(57) ABSTRACT

A radar system for a synthetic aperture radar including an arrangement of at least one transmitter, two receivers, two antennas and signal processing means located on a platform. The platform is arranged to move over ground and arranged to transmit a known signal shape and receive signals reflected from the ground. The received signals are used to produce a synthetic aperture radar image of the ground. The synthetic aperture radar image includes a number of resolution cells. The radar system is further arranged to operate in a frequency band with a center frequency and with a wide bandwidth of at least one octave. A first antenna and a second antenna have a length of less than half the wavelength of the center frequency. The radar system is further arranged for: a radar system transfer function to be flat over the frequency band and one-sided beam forming with wideband antenna gain. Also a corresponding method.

16 Claims, 5 Drawing Sheets

(56) References Cited

U.S. PATENT DOCUMENTS

| | | | |
|---|---|---|---|
| 4,122,529 A * | 10/1978 | Hoech | 708/846 |
| 4,675,677 A * | 6/1987 | von Maydell et al. | 342/25 A |
| 4,853,699 A * | 8/1989 | Easton | 342/25 C |
| 4,965,582 A * | 10/1990 | Hellsten | 342/25 A |
| 4,990,922 A * | 2/1991 | Young et al. | 342/52 |
| 5,047,784 A * | 9/1991 | Gerlach et al. | 342/201 |
| 5,070,337 A * | 12/1991 | Chen et al. | 342/201 |
| 5,260,708 A * | 11/1993 | Auterman | 342/25 C |
| 5,675,550 A * | 10/1997 | Ekhaus | 367/7 |
| 5,818,383 A * | 10/1998 | Stockburger et al. | 342/109 |
| 5,900,843 A | 5/1999 | Lee | |
| 5,910,785 A * | 6/1999 | Normant | 342/25 A |
| 5,969,662 A * | 10/1999 | Hellsten | 342/25 A |
| 6,025,800 A | 2/2000 | Hager | |
| 6,087,981 A * | 7/2000 | Normant et al. | 342/134 |
| 6,400,306 B1 * | 6/2002 | Nohara et al. | 342/25 R |
| 6,828,933 B1 * | 12/2004 | Doerry et al. | 342/194 |
| 6,836,240 B1 * | 12/2004 | Dubbert et al. | 342/194 |
| 6,870,500 B2 * | 3/2005 | Suess et al. | 342/25 F |
| 7,744,032 B2 * | 6/2010 | Quinn et al. | 244/30 |
| 7,843,382 B2 * | 11/2010 | Fam et al. | 342/175 |
| 7,876,256 B2 * | 1/2011 | Hellsten | 342/25 A |
| 7,884,752 B2 * | 2/2011 | Hellsten et al. | 342/25 A |
| 8,044,846 B1 * | 10/2011 | Urkowitz et al. | 342/179 |
| 2004/0150547 A1 * | 8/2004 | Suess et al. | 342/25 A |
| 2008/0204311 A1 * | 8/2008 | Fujimura | 342/25 B |
| 2010/0194626 A1 * | 8/2010 | Hofele | 342/175 |
| 2013/0201050 A1 * | 8/2013 | Hellsten | 342/21 |

OTHER PUBLICATIONS

PCT/ISA/237—Written Opinion of the International Searching Authority—Sep. 28, 2009.

* cited by examiner

RADAR SYSTEM AND METHOD FOR A SYNTHETIC APERTURE RADAR

CROSS-REFERENCE TO RELATED APPLICATIONS

This application is the national phase under 35 U.S.C. §371 of PCT/SE2009/050128 filed 6 Feb. 2009.

TECHNICAL FIELD

The present invention relates to the field of radar systems and antennas for Synthetic Aperture Radar (SAR).

BACKGROUND ART

SAR as such is a known technique, by which it is possible with a radar system mounted on a moving platform, normally an aircraft or a satellite, to obtain high resolution images of the ground. Radar responses from the ground are stored during some interval of the flight of the platform. The SAR image is obtained by signal processing in ways similar to computer tomography. Image resolution is determined by the angular span of viewing angles of the imaged ground, as well as the wavelength used and the distance between the radar and the ground. This means that the actual resolution of the radar antenna is of no importance for the resolution of the obtained image.

In SAR there is no fundamental requirement on resolution of the radar antenna, which consequently is not required to be directive. Thus it is possible to use unconventional radar frequencies, like meter waves, for SAR. For radar applications, which require a directive antenna, and use microwave frequencies, an antenna dish of around one meter is typical. By analogy, using meter waves, an antenna dish around hundred meters would be required. A small meter wave antenna would invariably produce a non-directive dipole radiation. For meter wave SAR such antenna is feasible since antenna resolution is of no importance.

There are SAR radar systems operating over the frequency band 27.5-82.5 MHz, corresponding to wavelengths between 11 m to 3.5 m, using this type of dipole antenna. Such a SAR radar can obtain images of the ground with a resolution of around 2.5 meters and operates across a frequency band of more than one octave. High radiation efficiency is achieved by letting the dipole antenna be of a length of around half the mean wavelength of the frequency band and also possessing significant thickness to provide sufficient bandwidth of the antenna. Suitable dimensions for such an antenna are a diameter of 0.2 m and a length of 4 m. Antennas of these dimensions are quite feasible on midsized and larger aircraft.

Several important SAR applications however, require small platforms such as small manned, fixed wing or rotary wing aircrafts or tactical Unmanned Aerial Vehicles (UAVs), for which antennas with the stated type of dimensions are too large.

U.S. Pat. No. 5,900,843 B discloses a VHF antenna for airborne SAR. The antenna is formed by cutting a slotline in the middle of the top wall of a very thin waveguide along its axis. The antenna is said to produce a downward and side-looking beam with horizontal polarization. The antenna dimensions required for this solution at VHF frequency range are however of the order of several meters and not feasible to use at small platforms.

There is thus a need to achieve smaller SAR antennas suitable for small manned vehicles and UAVs without compromising the SAR image quality.

SUMMARY

The object of the invention is to reduce at least some of the mentioned deficiencies with prior art solutions and to provide:
- a radar system and
- a method to solve the problem to achieve smaller SAR antennas suitable for small manned vehicles and UAVs without compromising the SAR image quality.

The object is achieved by providing a radar system for a Synthetic Aperture Radar, SAR, comprising an arrangement of at least one transmitter, two receivers, two antennas and signal processing means located on a platform. The platform is arranged to move over ground and arranged to transmit a known signal shape and receive signals reflected from the ground. The received signals are used to produce a SAR image of the ground. The SAR image comprises a number of resolution cells. The radar system is further arranged to operate in a frequency band with a centre frequency $f_c$ and with a wide bandwidth B of at least one octave wherein the radar system comprises a first and a second antenna having a length of less than half the wavelength of the centre frequency $f_c$. The radar system is further arranged for:

- a radar system transfer function $F_f$ to be flat over the frequency band B by arranging for signal equalization and pulse compression of the received signals by the signal processing means and
- one-sided beam forming with wideband antenna gain, by utilizing a first and a second receiver channel where the first receiver channel receives a signal from the first antenna and the second receiver channel receives a signal from the second antenna and further by arranging for matching antenna separation d, with a phase difference of $2\alpha$ degrees between the transmit signals fed into each antenna, $2\alpha$ being in the vicinity of 90 degrees.

The object is further achieved by providing a method for arranging a radar system for a Synthetic Aperture Radar, SAR, comprising an arrangement of at least one transmitter, two receivers, two antennas and signal processing means located on a platform. The platform is moving over ground and transmitting a known signal shape and receiving signals reflected from the ground. The received signals are used to produce a SAR image of the ground. The SAR image comprises a number of resolution cells. The radar system is operating in a frequency band with a centre frequency $f_c$ and with a wide bandwidth B of at least one octave wherein the radar system comprises a first and a second antenna having a length of less than half the wavelength of the centre frequency $f_c$. The radar system is further arranged for:

- a radar system transfer function $F_f$ to be flat over the frequency band B by equalizing and pulse compressing the received signals by the signal processing means and
- one-sided beam forming with wideband antenna gain, by utilizing a first and a second receiver channel where the first receiver channel receives a signal from the first antenna and the second receiver channel receives a signal from the second antenna and further by matching antenna separation d, with a phase difference of $2\alpha$ degrees between the transmit signals fed into each antenna, $2\alpha$ being in the vicinity of 90 degrees.

A further advantage is achieved if the Voltage Standing Wave Ratio (VSWR) of the radar system is arranged to be reduced by insertion of VSWR reducing means in the radar system between the transmitter and the antennas.

If further advantageous embodiments are implemented it can be achieved that, by the reciprocal 4-port device being a 90 degree hybrid both the VSWR reducing means is realized and the phase difference 2α is arranged to be substantially 90°.

Additional advantages are achieved by implementing one or several of the features, which will be explained below.

DETAILED DESCRIPTION

The invention will now be described in detail with reference to the drawings.

The invention addresses a new radar system and method for radar imaging of a surrounding ground surface from a moving platform, preferably a fixed wing or rotary wing aircraft or UAV. The imaging system is typically a Synthetic Aperture Radar (SAR) that will perform its task by a radar system comprising an arrangement of at least one transmitter, two receivers, two antennas and signal processing means located on the platform, which platform is moving over ground and arranged to transmit a known signal shape and receive signals reflected from the ground. The two antennas included in the radar system is henceforth referred to as the antenna arrangement. The received signals are used to produce the SAR image of the ground. A new technology has been devised in which the radar system performs the imaging task at meter wavelengths rather than (as is the normal case) at microwave frequencies. The choice of wavelength affects the radar design in several ways, and in particular as regards a suitable antenna arrangement. The invention describes a new radar system for SAR arranged to operate in a frequency band with a centre frequency $f_c$ and a wide bandwidth B of at least one octave. In one example it will operate in the frequency band 27.5-82.5 MHz, and thus cover approximately 1.6 octaves, and still meet the small antenna requirements. In this case the bandwidth B is 55 MHz which equals the highest frequency in the frequency band, called a top frequency, minus the lowest frequency in the frequency band, called a bottom frequency. The number of octaves is calculated as the second logarithm of the relation between the highest and lowest frequency of the frequency band. A bandwidth of 1.6 octaves corresponds to the top frequency being three times the bottom frequency. Though small, the antenna proposed does not compromise the attained SAR image quality. Other operating frequency bands are of course possible within the scope of the invention as long as the wavelength is below microwave frequencies, viz. in the frequency range 20-500 MHz. This field of application can be divided into VHF SAR and UHF SAR, understanding frequency bands below 100 MHz and frequencies in the band 100 to 500 MHz, respectively. The radar system is thus arranged to operate in a sub-band within the frequency range 20-500 MHz.

Figure 1A:
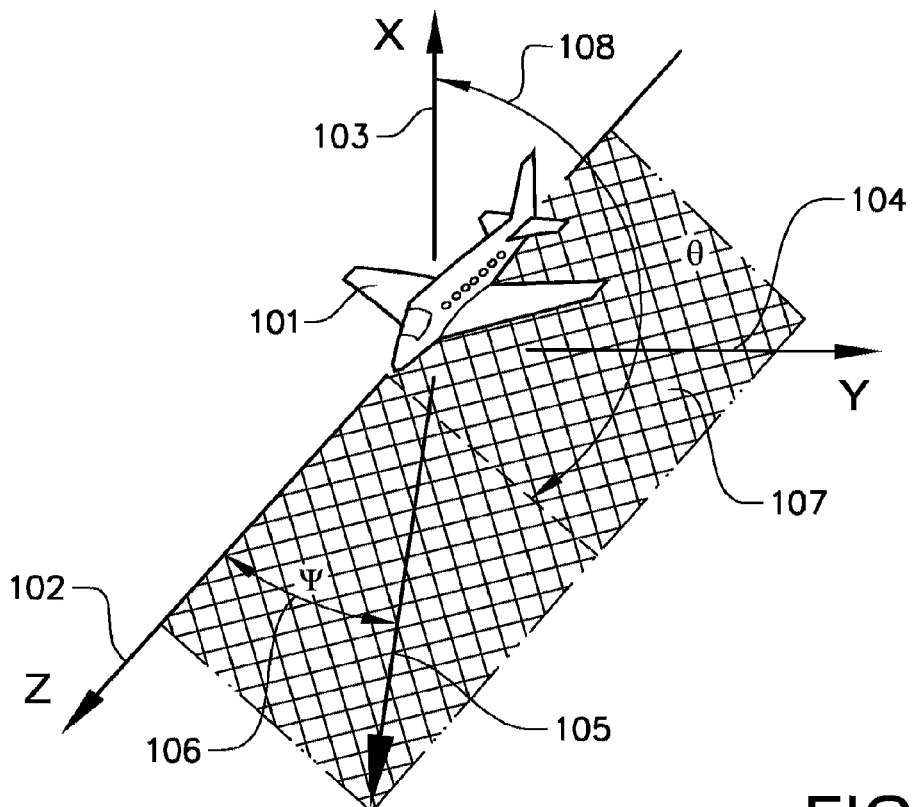
FIG. 1a schematically shows the angles defining an angular window.
Figure 1B:
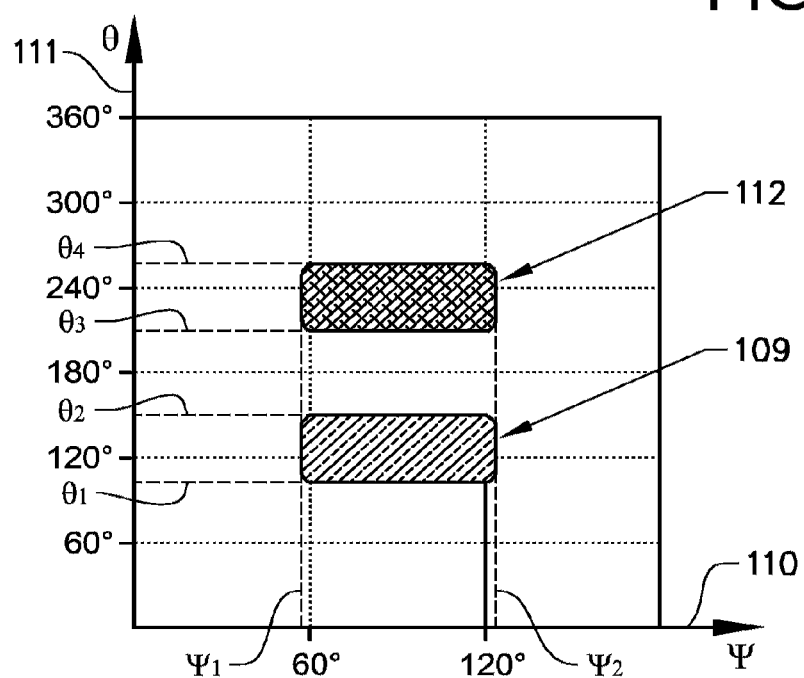
FIG. 1b schematically shows the angular window.

Related to the fact that SAR is an imaging system and not merely a detector of point targets, as is what basic radar detection theory presumes, there are a number of requirements on a meter wave radar system for SAR which have to be satisfied:

1. Radar system transfer function should be flat across the operating frequency band
2. Radar system transfer function should be flat in an angular window. FIG. 1a illustrates the 3D geometry of a radar system for SAR with the moving platform onboard an aircraft 101. The aircraft is moving along a z-axis, 102 being substantially parallel to the ground. An x-axis 103 is perpendicular to the ground and a y-axis perpendicular to the x- and z-axes. An arrow shows a viewing direction 105 of the radar system for SAR to a certain ground point, corresponding to the direction of the main lobe of the antenna arrangement of the radar system for SAR. A Doppler angle ψ, 106, is the angle between the z-axis and the viewing direction 105. The viewing direction 105 is located in a plane 107 illustrated with a grid pattern. An elevation angle Θ, 108, is the angle between the x-axis and the plane 107. The angular window 109 is described in FIG. 1b with a ψ-axis 110 and a Θ-axis 111. The angular window is defined as $\psi_1 \leq \psi \leq \psi_2$ and $\Theta_1 \Theta \leq \Theta_2$. Typically $\psi_1=55°$, $\psi_2=125°$ $\psi_1=100°$ and $\Theta_2=150°$. The majority of received energy should be received within the angular window 109 for all frequencies within the bandwidth B.
3. The radar system should provide zero radar response in a mirror window 112 defined by $\psi_1 \leq \psi \leq \psi_2$ and $\Theta_3 \leq \Theta \leq \Theta_4$ where $\Theta_3=360°-\Theta_2$ and $\Theta_4=360°-\Theta_1$ i.e. the mirror image of foregoing angular window 109.

Requirement 1 is needed for obtaining range resolution corresponding to the bandwidth utilized. Requirement 2 is needed for a sufficient angular variation of the ground response during the flight of the platform, so that the required angular resolution can be attained by the SAR process. Requirement 3 is due to the inability of the SAR process to discriminate between right and left returns. This discrimination must thus occur in the antenna arrangement.

Additionally it is preferred that the Voltage Standing Wave Ratio (VSWR) is small—preferably less than 2:1.

It is not obvious how to combine the requirement 1 with a requirement of antennas being small i.e. having a length less than half the wavelength of the centre frequency in the frequency band and thus having a radiation efficiency significantly less than unity for a large part of the band. A typical length of an antenna according to the invention is about 1 meter and a diameter of about 0.1 meter for operating in a frequency band of about 25-90 MHz, e.g. 27.5-82.5 MHz. According to theory and computer simulations, antenna efficiency $\eta_{ae}$ for such an antenna will vary linearly with frequency to the power of four. Generally $$\eta_{ae} = K\left(\frac{f}{f_c}\right)^4 \quad (1)$$

where K is a dimensionless constant, f is frequency and $f_c$ a centre frequency in the frequency band.

As an actual example, consider a VHF SAR system in the frequency band 27.5-82.5 MHz with the centre frequency $f_c$ and bandwidth B both equal to 55 MHz, and assume that $\eta_{ae}$ at the top frequency $f=3f_c/2$ is unity. Then:

$$1 = K\left(\frac{3f_c/2}{f_c}\right)^4 \Rightarrow K = \frac{16}{81} \quad (2)$$

One finds that $\eta_{ae}$=−19 dB for the bottom frequency. Since a small antenna is non-directive and close to omnidirectional, the radar (i.e. 2-way) gain G is the antenna efficiency squared. Thus G=−38 dB for the bottom frequency. An antenna of length L will have a near unity efficiency at $f=c/2L$. In this case:

$$1 = K\left(\frac{c/2L}{f_c}\right)^4 \Rightarrow K = \left(\frac{f_c}{c/2L}\right)^4 \quad (3)$$

where c is the speed of light.

The effect of frequency variation of antenna gain becomes evident in the radar equation, relating the receive and the transmit power densities $p_s$ and $p_{tx}$:

$$p_s = \frac{G}{f^2} \frac{c^2 \sigma}{4\pi(4\pi R^2)^2} p_{tx} \quad (4)$$

Here, R is range, i.e. the distance from the platform to the ground in the viewing direction 105 and σ is target cross section of a SAR resolution cell. The target cross section is a relation between the energy backscattered from the target and received by the radar antenna, and the energy intercepted by the target.

Combined with (1) and (3):

$$p_s = \left(\frac{2L}{c}\right)^8 f^6 \frac{c^2 \sigma}{4\pi(4\pi R^2)^2} p_{tx} \quad (5)$$

The radar cross section of any object exhibits an oscillatory behaviour with respect to frequency and aspect angle. The oscillatory behaviour of the cross section of the SAR resolution cell cannot be resolved by the SAR measurement. Thus in (4) and (5) σ is to be considered a mean value of the cross section over frequency and aspect angle, and as such a fixed value. It follows that deviation from spectral flatness depends on frequency to the power of six.

It will now be analyzed—in a number of steps—what obstacles formula (1) makes to the requirements 1-3, and how a design still is possible in which they can be satisfied.

According to formula (5), with small antennas not otherwise compensated, the radar system has the characteristics of a high pass filter with a transfer function:

$$F_f = 2\frac{L^4}{c^3} f^3 \frac{1}{\pi R^2} \sqrt{\frac{\sigma}{\pi}} \quad (6)$$

This radar system transfer function acts by multiplication $a_f \rightarrow F_f a_f$ on the spectral amplitude $a_f$ of the transmitted signal. $a_f$ is here the Fourier transform of the transmitted signal and $F_f a_f$ is the Fourier transform of the received signal. Upon an inverse Fourier transform of $F_f a_f$ over the radar bandwidth, the radar (2-way) impulse response function—IRF—of the antenna is obtained.

Denote by IRF$^{-1}$ the time dependent function obtained by an inverse Fourier transform of $\epsilon_f a_f$, $\epsilon_f$ being an equalizing factor provided by the reciprocal of the frequency behaviour of the transfer function $F_f$, viz.

$$\varepsilon_f = \frac{C}{f^3} \quad (7)$$

(where C is any arbitrarily chosen constant) over the radar bandwidth.

Figure 2:
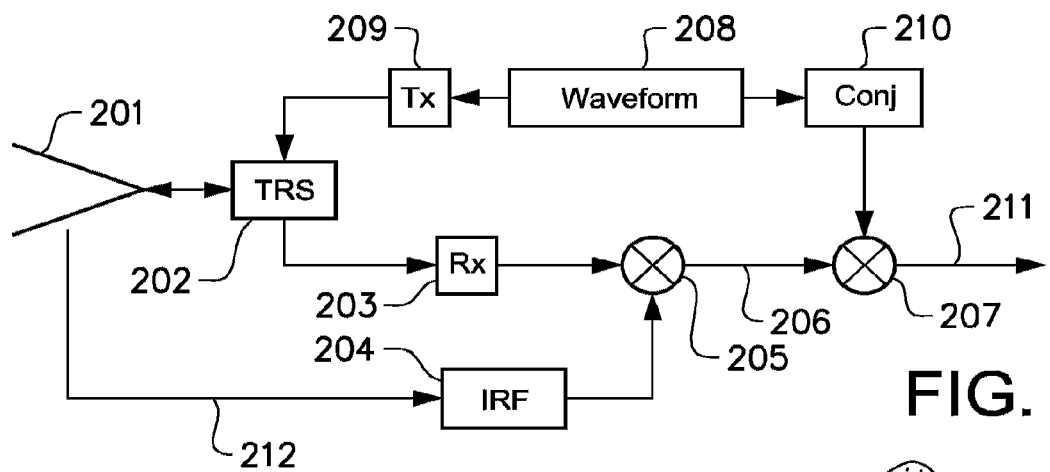
FIG. 2 schematically shows a block diagram of part of the invention including the function spectral flatness.

Radar system transfer flatness is regained by the radar system, depicted in FIG. 2, utilizing the signal processing steps:

1. A radar waveform is used characterized by transmitting a known signal shape (e.g. linear chirp or step frequency) over the bandwidth B for some prescribed amount of time τ, henceforth called the radar registration time.
2. The received signal is convolved with the function IRF$^{-1}$. This operation will be referred to as signal equalization and produces an equalized signal.
3. Pulse compression is applied by convolving the equalized signal with the conjugate of the transmit signal waveform.

By these processing steps the radar system transfer function $F_f$ is arranged to be flat over the frequency band B by arranging for signal equalization and pulse compression of the received signals by the signal processing means when transmitting a known signal shape.

In FIG. 2, a radar system design incorporating these three steps are depicted in schematic form. FIG. 2 shows a radar system comprising an antenna 201 connected to a Transmit/Receive Switch (TRS) 202. When the TRS is in receive position the signal received by the antenna is fed to a receiver Rx, 203. The arrow 212 illustrates that antenna transfer properties having been calculated externally are fed to an IRE unit 204. These antenna transfer properties are then stored in the IRF unit 204 in the form of time dependent function IRF$^{-1}$. The receiver and IRF units feed their outputs to a convolution unit 205. The convolution unit performs the convolution of the two signals and produces an output signal 206 being the equalized signal. The equalized signal is fed to a compression unit 207. A waveform generator 208 generates a transmit signal which is fed to a transmitter Tx, 209. The transmit signal is fed to the antenna 201 when the TRS is in a transmit position. The detailed arrangements of transmitter/receiver/TRS are well known to the skilled person and therefore not further explained here. The waveform generator also feeds the transmit signal to a conjugate unit 210 producing the conjugate of the transmit signal which is fed to the compression unit 207. Alternatively the conjugate of the transmit signal waveform can be calculated externally and fed to the compression unit. The compression unit convolves the equalized signal 206 with the conjugate of the transmit signal waveform and produces an equalized and compressed signal 211 with a linear phase characteristic. The waveform generator, 208, the TRS, 202, the IRF unit, 204, the convolution unit, 205, the compression unit, 207 and the conjugate unit, 210 are all defined as signal processing means.

Let $E_s$ be the received signal energy from a single point scatter, thus $E_s$ is the signal energy for a single resolution cell in the SAR image. Moreover let $E_n$ be the overall internal and external noise energy entering into the SAR signal processing. This noise energy is by the nature of this process equally distributed over all resolution cells. The number of independent resolution cells in the SAR image is just the number of independent measurements which is the time-bandwidth product $\tau B$ of the received radar signal, $\tau$ being the radar registration time. Thus the transmit power required for a certain signal-to-noise ratio—SNR—is obtained by equalling:

$$SNR = \tau B \frac{E_s}{E_n} \tag{8}$$

This expression will be further clarified in association with FIGS. 4 and 3 below.

Figure 4:
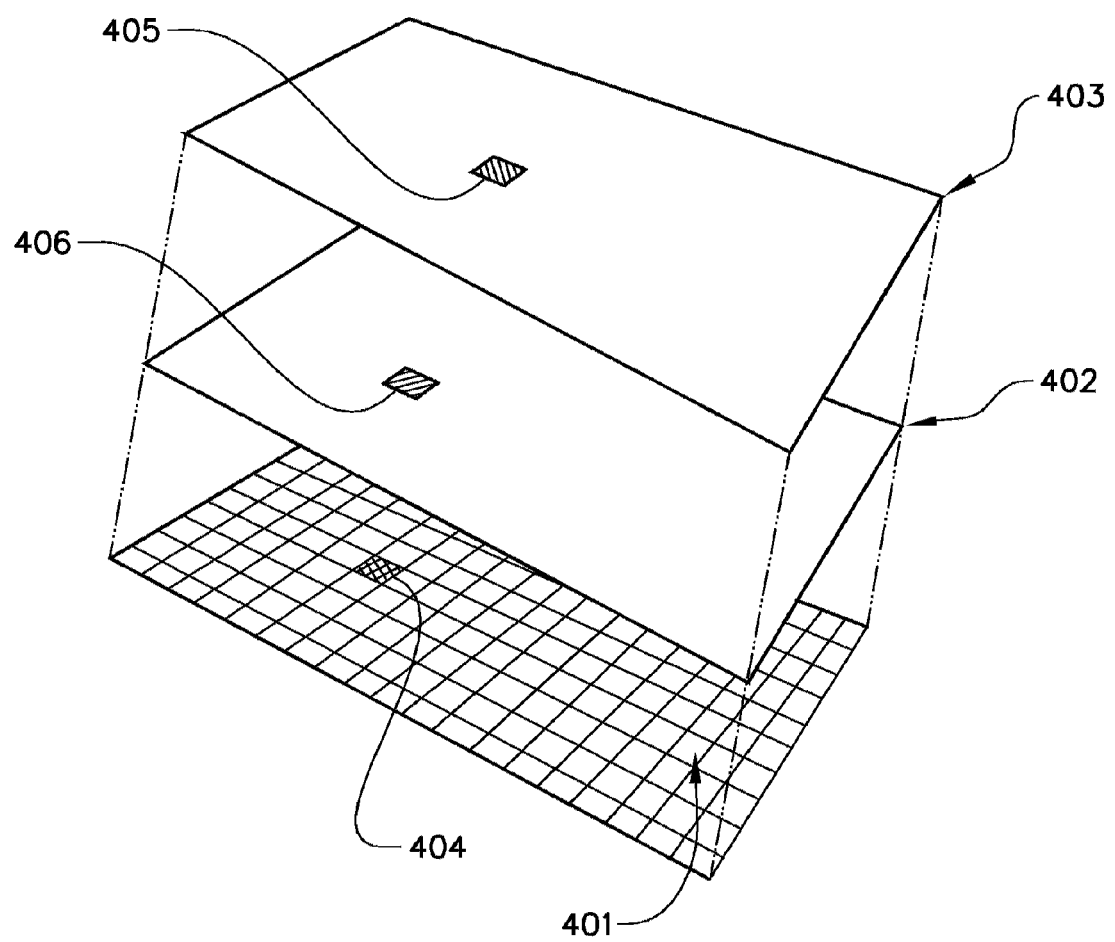
FIG. 4 schematically shows the received signal from one SAR cell compared to the received total external and internal noise.

FIG. 4 schematically shows a SAR image 401 divided in its resolution cells 404. The number of resolution cells can be in the order of 65 million cells per second, corresponding to the radar bandwidth of a 25-90 MHz system, whereas integration time will be many tens of seconds. The internal and external noise energy is illustrated with an external noise plane 402 and an internal noise plane 403. The area of each noise plane corresponds to the area of the SAR image. This means that the external and internal noise spreads over the total SAR image and the noise energy per resolution cell is drastically reduced and corresponds to the areas 405 and 406. The situation described in FIG. 4 is also expressed in the formula $E_s = E_n/\tau B$ when SNR=1, determining the noise equivalent cross section transmit power. When SNR>1 then $E_s > E_n/\tau B$, $\tau$ being the radar registration time.

Consider first a situation in which the equalization step 2 would have been excluded. For a VHF SAR system, as described in association with formula (2), with a unity gain antenna and where the centre frequency $f_c$ and the bandwidth B both are equal to $f_c$:

$$E_s = \int_0^{\tau 3} \int_{f_c/2}^{f_c/2} \frac{1}{f^2} \frac{c^2 \sigma}{4\pi(4\pi R^2)^2} p_{tx} df\, dt \tag{9}$$

$$= \frac{4}{3 f_c} \frac{c^2 \sigma \tau}{4\pi(4\pi R^2)^2} p_{tx}$$

Here, the transmit power density $p_{tx}$ at the output of the radar transmitter is assumed constant. Also, for SAR, range R will to some degree change with time, but this effect is neglected.

The noise energy $E_n$ is composed of the noise energy produced by the radar itself, given by the internal noise temperature $T_i$, and environmental viz. external noise energy given by the external noise temperature $T_e$. $E_n$ becomes in the case of a unity gain antenna:

$$E_n = \int_0^{\tau 3} \int_{f_c/2}^{f_c/2} (\eta_{ae} k T_e + k T_i) df\, dt = k \tau f_c (T_e + T_i) \tag{10}$$

where k is the wave number and equals $2\pi/\lambda$, $\lambda$ being the wavelength at frequency f.

Now make the same analysis but consider the effect of including step 2. With the equalization, the received signal energy is increased by the equalization factor $\epsilon_f$ (cf. (7)) squared, the equalization factor acting on the received signal power spectrum. One obtains instead of (9):

$$E_s = \int_0^{\tau 3} \int_{f_c/2}^{f_c/2} \epsilon_f^2 p_s^2 df\, dt \tag{11}$$

$$= C^2 \frac{K^2}{f_c^7} \frac{c^2 \sigma}{4\pi(4\pi R^2)^2} p_{tx} \tau$$

This equation determines the transmit power required for SNR=1 or equivalently the noise equivalent target cross section for a given transmit power.

The noise is increased by the equalization factor $\epsilon_f$ squared acting on the received noise power spectrum:

$$E_n = \tau \int_{f_c/2}^{3f_c/2} \epsilon_f^2 (\eta_{ae} k T_e + k T_i) df \tag{12}$$

$$\approx C^2 \frac{\tau}{f_c^5} \left( \frac{4}{3} K k T_e + \frac{32}{5} k T_i \right)$$

The transmit power required for SNR=1 is obtained by equalling $E_s = E_n/\tau B$. This equation provides the noise equivalent target cross section given the transmit power density. In the case of unity gain antennas and neglecting step 2, combining (9) and (10):

$$\sigma = \frac{4\pi(4\pi R^2)^2}{c^2} \frac{1}{E} f_c^2 \frac{3}{4} (k T_e - k T_i) \tag{13}$$

Here $E = \tau B p_{tx}$ is the total energy delivered by the transmitter during the radar registration time $\tau$. In the case of including step 2, equalling $E_s = E_n/\tau B$ through (11) and (12):

$$\sigma = \frac{4\pi(4\pi R^2)^2}{c^2} \frac{1}{E} f_c^2 \left( \frac{4}{3K} k T_e + \frac{32}{5K^2} k T_i \right) \tag{14}$$

As seen in (14) the value of the equalization constant C in (7) is of no importance for radar sensitivity. Only the difference in the weighting of different frequencies is of importance.

Formula (13) provides the noise equivalent target cross section a in the conventional case, i.e. when full length antennas are used, which approximately have unity gain, and when so called matched filtering for pulse compression, i.e. when the equalization step is excluded. Formula (14) provides the noise equivalent target cross section $\sigma$ in the case of the invention, i.e. when short antennas are used, with antenna efficiency according to formula 1, and when the lacking antenna efficiency is compensated for by the equalization step. Comparing the two cases for short and full size antennas, implemented on a VHF SAR system described in association with formula (2), and using formula (2) for inserting a K-value in formula (14) and by comparing the formulas (13) and (14), it is seen that there is a sensitivity increase with respect to external noise by a factor≈9 and a sensitivity increase with respect to internal noise by a factor≈219 for the short antenna compared to the full size antenna, i.e. an antenna with near unity radiation efficiency.

For a microwave device the external noise temperature can be assumed smaller than the internal noise temperature. If conditions for a VHF SAR system as described above should be the same for short and full size antennas, the use of short antennas and equalization to compensate them would require a transmit power increase of 219 times, which is not practical for the microwave regime. However, in the meter wave frequency regime terrestrial external noise is very strong due to man made and natural sources. Noise temperatures $T_e$=300 000° K or more are expected. Compared to these temperatures the internal noise of the radar can be neglected. Then according to formulas (13) and (14), the use of small antennas only requires a transmit power increase of 9 times to attain the sensitivity of a conventional system.

Another factor of relevance in comparing low frequency versus microwave SAR design, is that in low frequency SAR, the resolution is much closer to the wavelengths utilized. Thereby integration time, or radar registration time $\tau$, is much longer and the required transmit power to achieve a certain level of signal energy correspondingly lower. Therefore, even though noise temperatures are very high, the required transmit power is relatively independent of frequency. This conclusion does not only hold for VHF SAR but also for UHF SAR, operating at higher frequencies than VHF system, but still lower than 500 MHz. For UHF SAR the external noise temperature is significantly lower than at VHF, whereas the integration time is intermediate between that of VHF and microwave SAR.

It will be seen that the extra burden on transmit power implied by short antennas can be reduced further by a particular way of combining two short antennas, such that an overall compact design is achieved, which satisfies all the requirements 1-3.

Figure 3A:
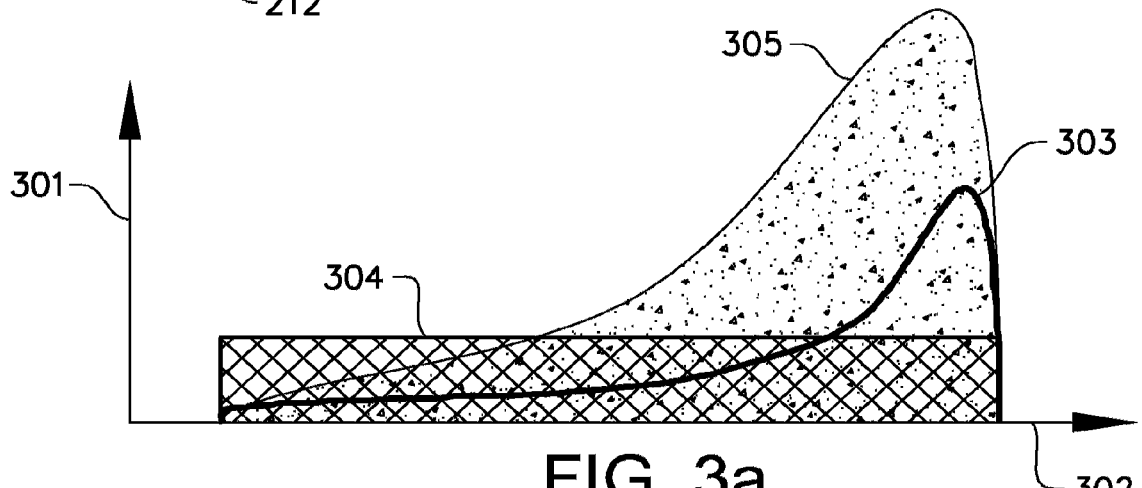
FIG. 3a schematically shows the received signal before equalization.
Figure 3B:
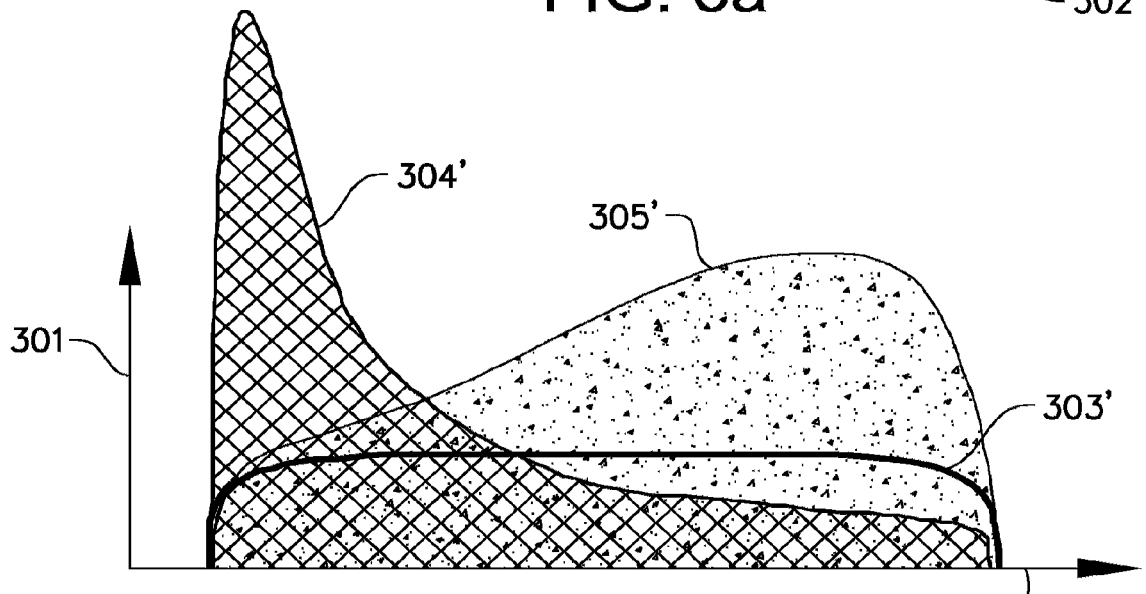
FIG. 3b schematically shows the received signal after equalization.

FIG. 3a shows received energy into the receiver as a function of frequency over the bandwidth B, with received energy on a y-axis 301 and frequency on an x-axis 302. The received signal, illustrated with signal curve 303, is very weak at low frequencies due to the strong frequency dependence of the transfer function as described e.g. in formula (6). The internal noise level is assumed constant over frequency and relatively low and is illustrated as the internal noise curve 304 which thus becomes a straight line. The external noise is dominating at VHF frequency as mentioned above and is illustrated with external noise curve 305. The external noise also has a frequency dependence as has the received signal. FIG. 3b illustrates the situation when the equalization factor $\epsilon_f$ has been applied to the received energy signal. The received signal has now become constant over the bandwidth, and is depicted with signal curve 303'. Due to the equalization, the internal noise and the external noise have been amplified at lower frequencies, as depicted by the internal noise curve 304' and the external noise has been reduced at higher frequencies as depicted by external noise curve 305'. The total energy received over the bandwidth is the area between the x-axis 302 and the curves. This means e.g. that the received signal energy over the total bandwidth before equalization is the area between the signal curve 303 and the x-axis. After equalization the total signal energy is the area between the signal curve 303' and the x-axis. This area is the equal to the area between the curve 303 and the x-axis.

Figure 5:
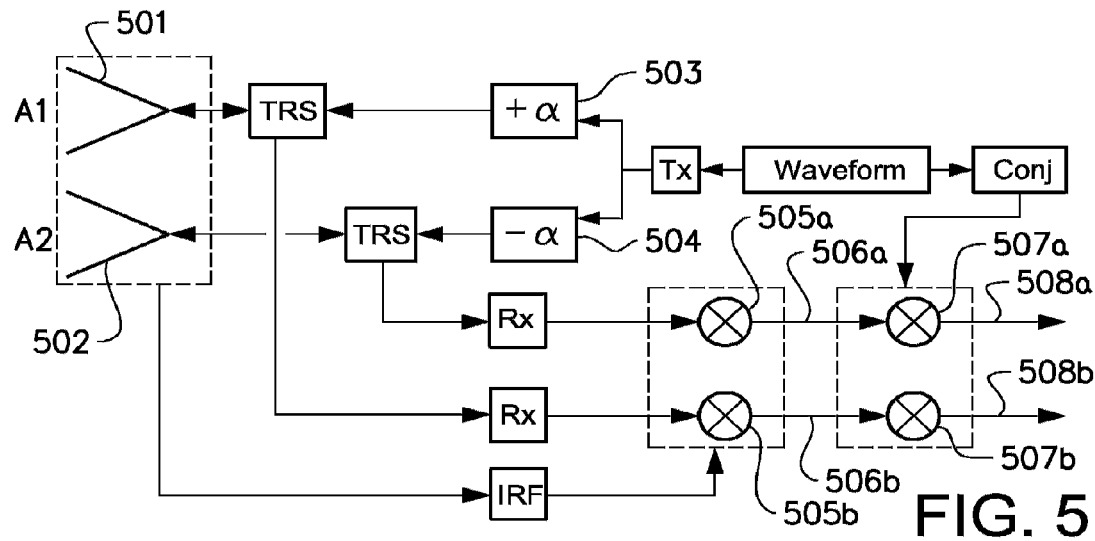
FIG. 5 schematically shows a block diagram of the invention including the functions spectral flatness and one-sided beam forming.

The low frequency radar system is required to provide one-sided directivity according to requirements 2 and 3 above. This one-sidedness is obtained by utilizing two receiver channels as shown in FIG. 5, where each channel receives the signal from its own separate antenna. Each antenna can comprise one or more antenna elements. Henceforth in the description the invention is exemplified with antennas having one antenna element each. FIG. 5 shows an example of the invention with a first receiver with a first antenna 501 in a first receiver channel and a second receiver with a second antenna 502 in a second receiver channel, the antennas having a length of less than half the wavelength of the centre frequency $f_c$. Each channel is working as described for the configuration according to FIG. 2. The difference compared to FIG. 2 is that the transmit signal to the first antenna is phase shifted with an angle +α in a first phase shift unit 503 and the transmit signal to the second antenna is phase shifted with an angle −α in a second phase shift unit 504.

The receivers, Rx, and IRF units feed their outputs to convolution units 505a and 505b. The convolution units perform the convolution between the input from the IRF unit and each of the signals from the two receivers and produces output signals 506a and 506b being the equalized signals from the first and the second receiver channel. The equalized signals are fed to a first compression unit 507a for the first receiver channel and a second compression unit 507b for the second receiver channel. The compression units convolves the equalized signals with the conjugate transmit signal waveform from the conjugate unit 210 and produces a first equalized and compressed signal 508a from the first receiver channel and a second equalized and compressed signal 508b from the second receiver channel. The first and the second equalized and compressed signals 508a and 508b are then used in the radar system for SAR to form the one-sided antenna beam form as will be explained in association with formula (16). The transmitted signal will, due to the phase shifting, be beam formed as will be described in more detail in association with FIG. 6. The phase shift units are also included in the signal processing means.

Figure 6:
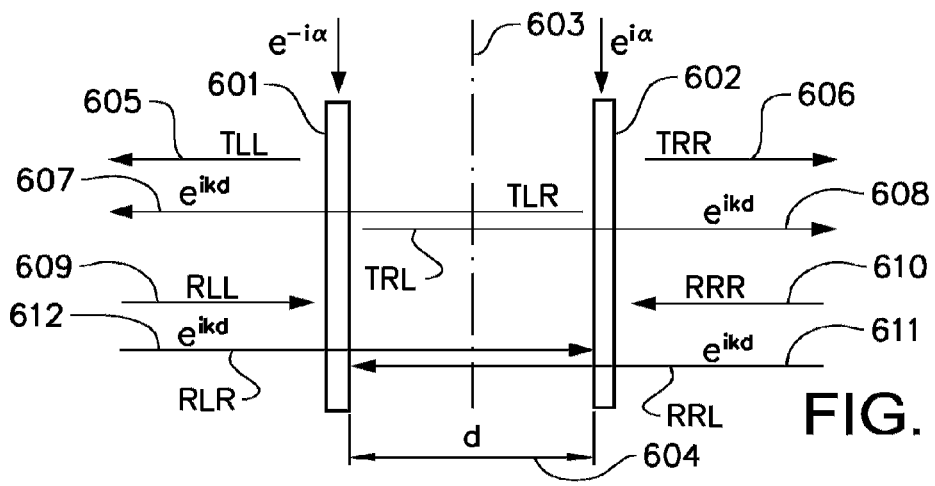
FIG. 6 schematically shows an antenna model.

Irrespective of any particular antenna arrangement, it is possible to obtain a one-sided antenna beam forming by digital processing of the data from the two receiver channels. Such a beam forming process involves in the general case the solution of the linear equation system posed by two signals arriving from two distinct directions and independently combined in two distinct receiver channels as is schematically indicated in FIG. 6. This solution will in the general case involve a coherent subtraction of the signals from the two receiver channels. Thus, unless a suitable solution for the antenna arrangement is found as regards transmit phase shifts imposed on the transmit signals fed into each antenna and how the two antennas are arranged with respect to each other, beam forming would cause a power loss in the reception chain and may in unfavourable designs require an excessive amount of transmit power. Suitable arrangements for the related problem of creating narrow band beam nulls have been extensively studied and are well known. In the present case of creating a wide band one-sided beam, the required beam can be obtained by matching a properly chosen antenna separation with a phase separation imposed on the transmit signals fed into each antenna, as will be demonstrated. This arrangement is highly favourable since it indeed yields a gain in signal to noise ratio reducing the requirement for transmit power, contrary to creating a power loss due to coherent subtraction between signals from the two receiver channels.

FIG. 6 shows a Left antenna 601, corresponding to the first antenna 501 of FIG. 5, connected to the first receiver channel and fed with a complex transmit signal, phase shifted by −α and denoted $e^{-i\alpha}$ in FIG. 6 (the TL-signal). A Right antenna 602, corresponding to the second antenna 502 of FIG. 5, is connected to the second receiver channel and fed with a complex transmit signal, phase shifted by +α and denoted $e^{i\alpha}$, in FIG. 6 (the TL-signal). The antennas are positioned substantially parallel to each other and a left/right symmetry plane 603 aligned with the direction of movement of the platform. The left antenna being the antenna to the left of the symmetry plane and the right antenna being the antenna to the right of the symmetry plane when looking in the direction of movement. The antennas are separated by a distance d, 604. Arrow 605 represents a signal Transmitted to the Left from the Left antenna, the TLL-signal and arrow 606 represents a signal Transmitted to the Right from the Right antenna, the TRR-signal. Arrow 607 represents the signal Transmitted to the Left from the Right antenna, the TLR-signal. The TLR-signal becomes phase shifted with an amount kd, where k is the wave-number being equal to 2π/λ, when combining with the TLL-signal. The phase shift between the two signals transmitted to the left, due to the geometrical separation, is thus kd and the TLR signal can be written $e^{ikd}$ since the coupling between the antennas here is assumed to be negligible. This means that, since the antennas are short and far from resonance the TLR signal will pass the left antenna without any significant absorption of the TLR signal in the left antenna. This assumption is made for all signals passing one antenna and then arriving at the other antenna. Arrow 608 represents the signal Transmitted to the Right from the Left antenna, the TRL-signal. The TRL-signal is phase shifted compared to the TRR-signal with an amount kd. The phase shift between the two signals transmitted to the right is thus kd and the TRL-signal can be written $e^{ikd}$. The arrow 609 represents a Received signal from the Left side to the Left antenna, the RLL-signal and the arrow 610 represents the Received signal from the Right to the Right antenna, the RRR-signal. The arrow 611 represents the Received signal from the Right side to the Left antenna, the RRL-signal. The RRL-signal is phase shifted with an amount kd compared to the RLL-signal and can thus be written $e^{ikd}$. The arrow 612 represents the Received signal from the Left side to the Right antenna, the RLR-signal. The RLR-signal is phase shifted with an amount kd compared to the RRR-signal and can thus be written $e^{ikd}$. Thus FIG. 6 illustrates the different contributions to the transfer function of the left and right antennas with respect to signals coming from the left and the right side of the symmetry plane 603. These contributions consists of the phase shifts ±α of the transmit signals TR and TL and the phase shifts, kd, due to the geometrical separation between the antennas. By matching the antenna separation d, with the phase difference of 2α degrees between the transmit signals fed into each antenna, a shaping of the radar beam is accomplished. By selecting suitable values for d and α a one-sided beam forming can be achieved, thus receiving no signals from mirror window 112.

The gain in signal-to-noise ratio in beam forming is determined with respect to external noise, since this is the dominant noise form. However the arrangement must be checked for internal noise growth, since internal noise cannot be allowed to grow uncontrollably or it may turn out to be the dominant noise form after the beam forming.

In the present case, since the antennas are short, they will radiate as dipoles, i.e. in an omnidirectional pattern except for the nodes along their length extension. The combined right/left performance of the two antennas may be well characterized by a 1-dimensional model of right and left transmission along the axis through the centre of the two antennas. Radiation in the other directions follow a smooth transition between right and left radiation. Thus antenna transfer characteristics can be modelled by a 2×2 linear transform between the unit Impulse Response Function (IRF) from right, $s_R$, and left, $s_L$, and the signal output from either the first or the second receiver channel, denoted $r_R$ and $r_L$ to indicate if it is the signal output from the antenna to the right or left of the symmetry plane 603. $s_R$ is thus the IRF from the first antenna, in this case the antenna to the right of the symmetry plane of the platform as defined in FIG. 6, when this antenna is the only antenna. $s_L$ is the IRF from the second antenna, in this case the antenna to the left of the symmetry plane of the platform as defined in FIG. 6, when this antenna is the only antenna. Assuming that the imposed phase difference on transmit signals feeding the two antennas is 2α, one antenna being fed with a signal having a phase shift +α and the other antenna being fed with a signal having a phase shift −α. Since the antennas are short the coupling between the two antennas may be neglected and the transform reads:

$$\begin{pmatrix} r_R \\ r_L \end{pmatrix} = \begin{pmatrix} e^{i\alpha} + e^{-i\alpha}e^{ikd} & e^{i\alpha}e^{i2kd} + e^{-i\alpha}e^{ikd} \\ e^{-i\alpha}e^{i2kd} + e^{i\alpha}e^{ikd} & e^{-i\alpha} + e^{i\alpha}e^{ikd} \end{pmatrix} \begin{pmatrix} s_R \\ s_L \end{pmatrix} \quad (15)$$

Here d is the separation between the antennas and k is the wave number equal to 2π/λ.

The system can be inverted to yield:

$$s_R = \frac{1}{1 - e^{i2kd}} \frac{r_R - e^{ikd}r_L}{e^{i\alpha} + e^{-i\alpha}e^{ikd}} \quad (16)$$

$$s_L = \frac{1}{1 - e^{i2kd}} \frac{r_L - e^{ikd}r_R}{e^{-i\alpha} + e^{i\alpha}e^{ikd}}$$

Formula (16), comprises two sub formulas, the first sub formula will be used for obtaining the radar signal coming from only the right hand side, $s_R$, and the second sub formula will be used for the radar signal coming only from the left hand side, $s_L$. The inputs to formula (16) are the equalized and compressed radar signals $r_R$ and $r_L$ corresponding to the signals represented by arrows 508*a* and 508*b* in FIGS. 5 and 708*a* and 708*b* in FIG. 7. After an actual selection of the phase shift α only one of the sub formulas—say the sub formula for $s_R$—having a low influence of noise should be used. The other sub formula for $s_L$ will correspond to high influence of noise. When the opposite selection of the phase shift α is made, i.e. choosing −α instead of +α, the sub formula for $s_L$ is the one to be used.

The actual calculation of $s_R$ and $s_L$ according to formula (16) is performed in a conventional way, well known to the skilled person, by SAR signal processing means not shown in the figures. These SAR signal processing means are also included in the signal processing means. When a phase shift of +α has been selected for one antenna (and thus −α for the other antenna) the SAR signal processing means will be arranged to select the signal with low influence of noise corresponding to the signal coming from the right side, i.e. $s_R$ or the signal coming from the left side, i.e. $s_L$. When a phase shift of −α has been selected for the one antenna (and thus +α for the other antenna) the SAR signal processing means will be arranged to select the opposite signal to the +α selection. By selecting the phase shift for the one antenna to be +α or −α and thus −α or +α for the other antenna, as the phase difference between the antenna signals shall be 2α, it will thus be possible to select if signals coming from the right or the left side should be used. The radar system can be set to permanently use a phase shift of $+\alpha$ for the one antenna and thus always receive signals from one side, say the right side. Alternatively the radar system can comprise switching means where it will be possible to select a phase shift of $+\alpha$ or $-\alpha$ for the one antenna and thereby select if signals should be received from the right or the left side. The definitions of left and right side is explained in association with FIG. 6.

In this way a one-sided beam forming with wideband antenna gain is achieved by utilizing the first and the second receiver channel where the first receiver channel receives a signal from the first antenna and the second receiver channel receives a signal from the second antenna and further by arranging for matching antenna separation d, with a phase difference of $2\alpha$ degrees between the transmit signals fed into each antenna.

External noise, $n_{ext}$, will be coherent in the left and right receiver channel whereas internal noise, $n_{int}$, is incoherent between the receiver channels. External noise has a left and right hand Fourier component $n_{ext,R}$, $n_{ext,L}$ impingent on the antennas from either side. The components themselves are incoherent but with equal variance. Denote by $n_{int,R}$, $n_{int,L}$ the incoherent left and right internal noise components (of equal variance). In the case of no transmitted radar signal the received signal in the spectral domain becomes:

$$r_R = n_{ext,R} + e^{ikd} n_{ext,L} + n_{int,R}$$

$$r_L = n_{ext,L} + e^{ikd} n_{ext,R} + n_{int,L} \tag{17}$$

The noise is expected to vary randomly in slow time. By insertion into equation (16) and averaging over time:

$$\langle |s_R|^2 \rangle = \frac{\langle |n_{ext}|^2 \rangle}{2[1 + \cos(2\alpha - kd)]} + \frac{\langle |n_{int}|^2 \rangle}{2[1 + \cos(2\alpha - kd)][1 - \cos(2kd)]} \tag{18}$$

Angular brackets $\langle \ \rangle$ means that the average over time shall be calculated for the expression within the brackets. Vertical lines $\|$ means that the absolute value shall be calculated for the expression within the vertical lines.

External and internal noise factor contributions to the received signal energy due to the beamforming are identified as:

$$\Gamma_{ext,bf} = \frac{1}{2[1 + \cos(2\alpha - kd)]} \tag{19}$$

$$\Gamma_{int,bf} = \frac{1}{2[1 + \cos(2\alpha - kd)][1 - \cos(2kd)]}$$

Ideally, both factors should be as small as possible, which is the case if:

$$\cos(2\alpha - kd) = 1$$

$$\cos(2kd) = -1 \tag{20}$$

These requirements are satisfied if $$2\alpha = kd = \pi/2 \tag{21}$$

Since these are minima values for $\Gamma_{ext,bf}$ and $\Gamma_{int,bf}$ they will vary slowly with parameter variations, implying that they will remain small over a bandwidth. However, dependence of frequency is seen to be more pronounced for $\Gamma_{int,bf}$ than for $\Gamma_{ext,bf}$. This is in order since, as pointed out, there is a larger tolerance for internal noise than for external.

Within the considered frequency band 25-90 MHz and choosing d=1.3 m $$39° \leq kd \leq 140°; \ 78° \leq 2kd \leq 280° \tag{22}$$

The variations have a fairly small impact on $\Gamma_{ext,bf}$ and a tolerable impact on $\Gamma_{int,bf}$. Indeed over the bandwidth:

$$\frac{1}{4} \leq \Gamma_{ext,bf} \leq \frac{1}{3} \tag{23}$$

$$\frac{1}{8} \leq \Gamma_{int,bf} \leq \frac{3}{8}$$

Note that from this analysis, that the proposed radar system provides the required one-sided character to the radar antenna, it also follows that the phase shift $2\alpha$, also denoted as the phase difference $2\alpha$, in feeding the antennas can differ from 90 degrees to a significant degree without disrupting antenna performance. For instance, a departure from 90 degrees by say ±10-20 degrees, will make the noise factors $\Gamma_{ext,bf}$, $\Gamma_{int,bf}$ less favourable but only to a degree which may be acceptable with respect to what performance is required from the radar system and what power the transmitter will provide. By the same argument the departure from 90 degrees may be even larger. Actually the formulas (19) will decide on a case to case basis if a certain degree of departure from 90 degrees is acceptable for a particular radar design in a particular application. This observation is the mathematical foundation for stating that the phase shift $2\alpha$ only is required to be in the vicinity of 90 degrees.

Preferably the phase shift $2\alpha$ should be selected to be 90 degrees or substantially 90 degrees.

The noise factor variation with frequency has been demonstrated less flat for internal than for external noise. Nevertheless both noise factors remain less than unity implying a gain increase by the left-right separation process.

The external noise determines the required transmit power under the condition that internal noise can be neglected. Since the internal noise factor is less than unity, the influence of internal noise will be suppressed further by the antenna design.

In summary, a radar design is feasible in which only the external noise determines the required transmit power. Since the external noise factor is less than ⅓, the required power increase compared to a situation of wavelength sized, or full sized, and thus lossless antennas is 3 times (given that it was 9 times without taking into account the antenna arrangement noise factor). The increase of transmitted power required to be able to match SNR of a conventional system using full size antennas, is thus about three times, i.e. it is moderate. This conclusion is due to the fact that the internal noise of the radar can be neglected as explained in association with formulas (13) and (14). In this way the transmitted power is arranged in such a way that after equalization, pulse compression and the one-sided beam forming, described above, the received signal energy $E_s$ from one resolution cell during the radar registration time $\tau$ will at least equal the sum of external and internal noise energy $E_n$, divided with a time/bandwidth product $\tau B$ which means that $E_s \geq E_n/\tau B$ and thus SNR≥1.

That the gain increase holds for a large relative bandwidth is due to the short true time delay between the antennas (obtained by their relatively small separation) and the phase bias between the signals fed to the antennas. The gain increase can also be seen as constructive interference across the frequency band achieved in (16), by this selection of parameters.

A design has been provided which combines smallness and sufficient power efficiency with requirements 1-3. Additionally it is preferred that the VSWR of the radar system is arranged to be reduced and to be low enough to suit standard solutions for transmit power generation. This can be accomplished with VSWR reducing means being inserted in the radar system between the transmitter and the antennas.

Figure 7:
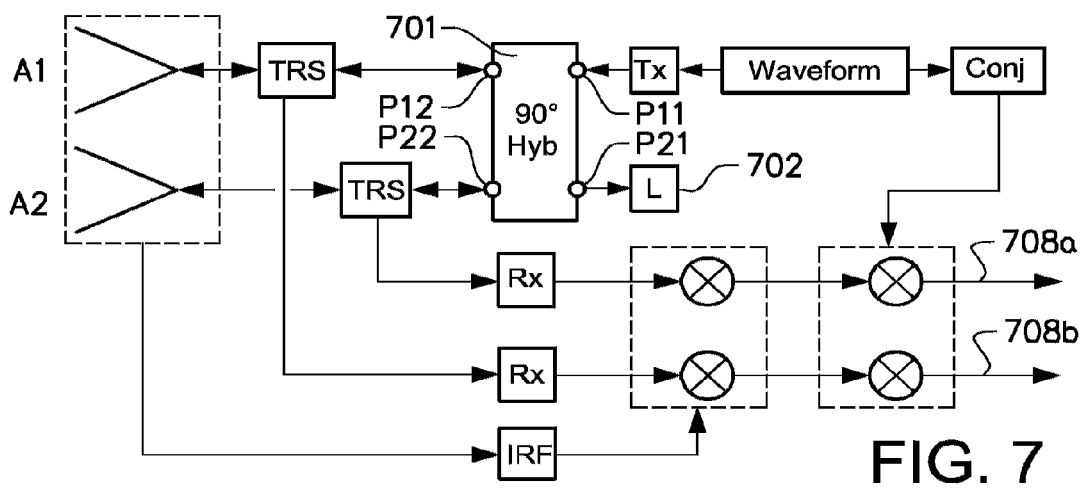
FIG. 7 schematically shows a block diagram of the invention including the functions spectral flatness, one-sided beam forming and VSWR reduction.

The VSWR reducing means can be accomplished with conventional means as matching circuits and the phase shifts can be accomplished by conventional phase shifters. A preferred solution is however to use a reciprocal 4-port device as both a VSWR reducing means and as a means for realizing the phase difference $2\alpha$ of substantially 90 degrees between the transmit signals fed into the antennas. It turns out that that the insertion of the reciprocal 4-port device, preferably a 90° hybrid, in the radar system between the transmitter and the antennas can meet both these objectives. This is an advantage as both objectives can be met with a single component. A realisation of a radar system including the reciprocal 4-port device, thus reducing the VSWR, is shown in FIG. 7. FIG. 7 shows an example of the invention with a radar system corresponding to FIG. 5 but with the first 503 and the second 504 phase shift units exchanged with a 90° hybrid unit, 701, and a load, 702. The antennas have, as in the example of FIG. 5, a length of less than half the wavelength of the centre frequency $f_c$. The hybrid unit has 4 ports, a third port P11 connected to the transmitter, a first port P12 connected to the first antenna via one TRS and a second port P22 connected to the second antenna via the other TRS. A fourth port P21 is connected to the load 702. The 90° hybrid unit 701 yields for an input signal in the third port P11, phase shifted output signals in the first port P12 and the second port P22, with a phase shift between them being substantially 90 degrees, as is described in association with FIG. 8. The 90° hybrid thus achieves a phase difference of 90° between the transmit signals fed into the antennas, corresponding to $2\alpha=90°$. The hybrid unit, 701 and the load 702 are also included in the signal processing means. The equalized and compressed signals from the radar system according to FIG. 7 are denoted 708a and 708b corresponding to the signals 508a and 508b in FIG. 5.

The configuration of the radar system for SAR thus comprises:
the first 501, 601 and the second 502, 602 antenna,
a Transmit/Receive Switch connected to each antenna
the reciprocal 4-port device 701 having the first port P12 connected to the first antenna via one of the Transmit/Receive Switches and the second port P22 connected to the second antenna via the other Transmit/Receive Switch,
the waveform generator 208 being connected to the third port P11 of the reciprocal 4-port device 701 via the transmitter 209,
the load 702 is connected to the fourth port P21 of the reciprocal 4-port device
the first receiver being connected to the first antenna via one of the Transmit/Receive Switches in the first receiver channel and the second receiver is connected to the second antenna via the other Transmit/Receive Switch in the second channel,
the receivers and the IRF-unit 204 being connected to the first 505a and the second 505b convolution unit and the first convolution unit 505a is connected to the first compression unit 507a in the first channel and the second convolution unit 505b is connected to the second compression unit 507b in the second channel, the second channel being in parallel to the first channel, the compression units both being connected to the conjugate unit 210 and each compression unit is arranged to produce the equalized and compressed signal for their respective channels.

Figure 8A:
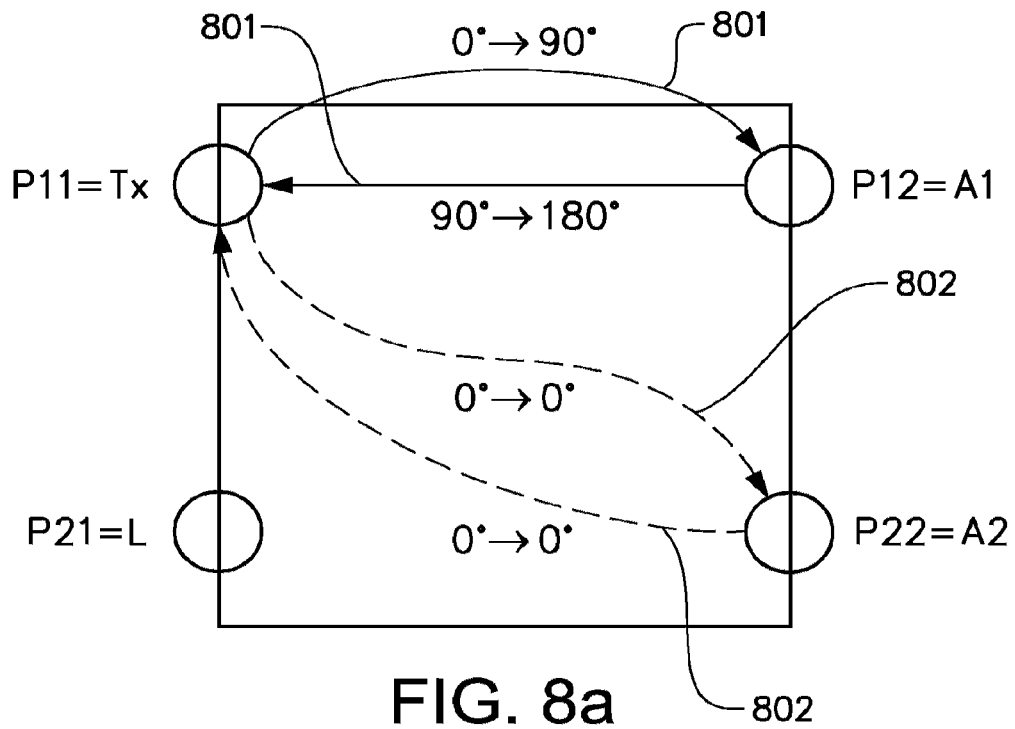
FIG. 8a schematically shows the behaviour of a 90° hybrid during transmission of radar signals.
Figure 8B:
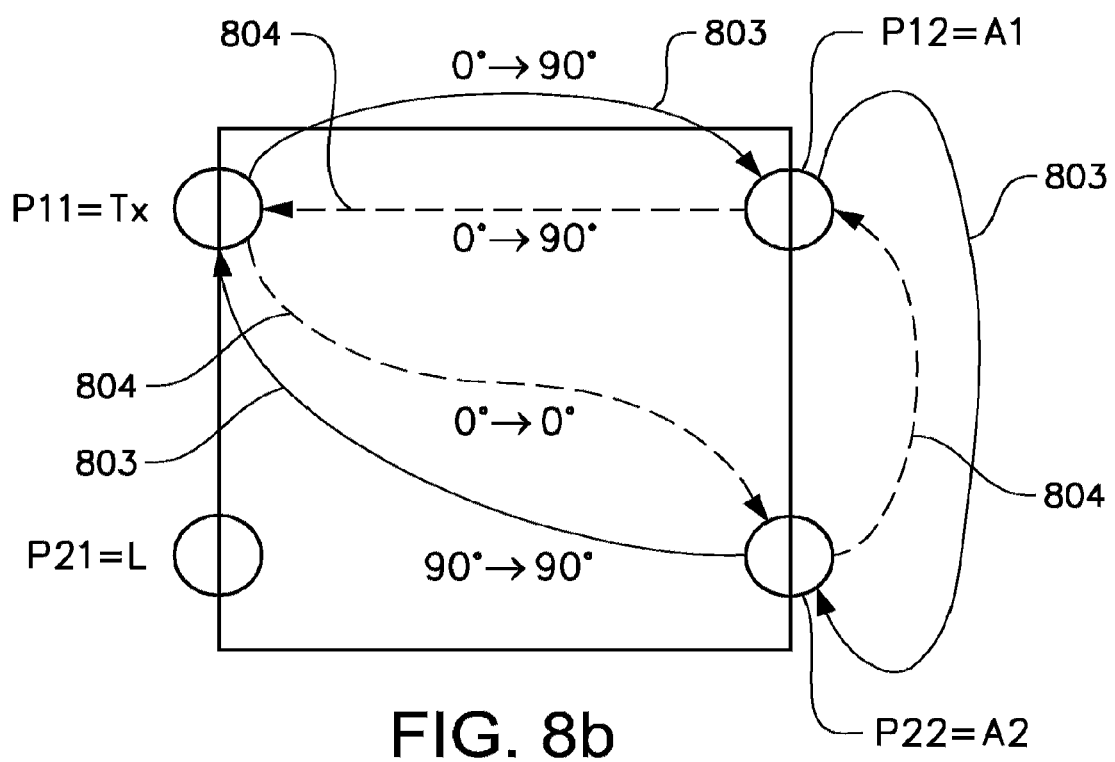
FIG. 8b schematically shows the behaviour of a 90° hybrid during reception of radar signals.

FIG. 8a shows the 90° hybrid, 701, which is a reciprocal 4-port device in the sense it has the same performance if input and output ports are substituted according to P11←→P22 and P21←→P12. In the present application, the antennas A1 and A2 are connected to the first port P12 and the second port P22 and the transmitter Tx to the third port P11. A first signal 801, shown with a continuous line, is phase shifted 90° on its way from the third port P11 to the first port P12. The part of the signal which is reflected at the first port P12 (which will be large since the antenna connected to the first port P12 is short) is phase shifted with an additional 90° on its way back to the third port P11, thus a total phase shift of 180° is experienced by the reflected signal. This is due to inherent properties in the hybrid. A second signal 802, shown with a dashed line, will not be subject to any phase shift on its way from the third port P11 to the second port P22. Similarly the signal reflected at the second port P22 back to the third port P11 will not be subject to any phase shift due to inherent properties of the hybrid. Thus the first and second signal will have a phase difference of 180° and thus cancel at the third port P11. At a forth port P21 the signal components will however add constructively. In the application, this combined reflected signal at the fourth port P21 is sunk by a load L, 702, connected to the fourth port P21. The reflected energy from the two antennas will thereby in its entire be fed into this load. In all, the transmit signal components which are reflected by the antenna due to its low radiation efficiency will not cause any reflected signal impingent on the transmitter itself.

While reflected signals cancel, signals coupling without delay or phase shift between the first port P12 and the second port P22 add constructively at the third port P11. Dashed signal path in FIG. 8b corresponds to coupling between the second port P22 and the first port P12 and continuous signal path corresponds to coupling between the first port P12 and the second port P22. Energy received at the third port P11 due to coupling between the antennas is reflected to the first port P12 in a third signal 803 and to the second port P22 in a fourth signal 804. The third signal is phase shifted 90° due to the inherent property of the hybrid. The third signal is coupled to the second port P22 through the air without phase shift and then further to the third port P11 without phase shift due to inherent properties of the hybrid. When the third signal arrives at the third port P11 it is thus phase shifted 90°. The fourth signal is coupled to the first port P12 through the air without phase shift and then back to the third port P11 with a 90° phase shift due to the inherent properties of the hybrid. The third and fourth signals thus add constructively at the third port P11. Thus the coupling between the antennas will give rise to a signal impingent on the transmitter. For lower frequencies the low radiation efficiency will make the coupling effect small. However, due to the generally omni-directional character of dipole radiation, even at the highest frequencies, where the antennas have high radiation efficiency, the part of the radiation absorbed by the neighbouring antenna will be sufficiently small for the coupling effect to be tolerably small. In summary, the proposed design therefore solves the problem of connecting the antennas to a standard transmit power generation design.

The invention is not limited to the embodiments and examples described above, but may vary freely within the scope of the appended claims.

The invention claimed is:

1. A radar system for a synthetic aperture radar, comprising:
    an arrangement comprising at least one transmitter, two receivers, two antennas and a signal processor;
    a platform on which the arrangement is located, the platform being arranged to move over ground and arranged to transmit a known signal shape and receive signals reflected from the ground, the received signals being used to produce a synthetic aperture radar image of the ground, the synthetic aperture radar image comprising a number of resolution cells, and the radar system being arranged to operate in a frequency band with a center frequency and with a wide bandwidth of at least one octave;
    a first antenna and a second antenna having a length of less than half a wavelength of the center frequency,
    wherein a radar system transfer function is arranged to be flat over the frequency band by arranging for signal equalization and pulse compression of the received signals by the signal processor, and wherein one-sided beam forming with wideband antenna gain is arranged utilizing a first receiver channel and a second receiver channel where the first receiver channel is arranged to receive a signal from the first antenna and the second receiver channel is arranged to receive a signal from the second antenna and further by arranging for matching antenna separation, with a phase difference of $2\alpha$ egrees between the transmit signals arranged to be fed into each antenna, $2\alpha$ being in the vicinity of 90 degrees.

2. The radar system according to claim 1, wherein a voltage standing wave ratio of the radar system is arranged to be reduced by insertion of a voltage standing wave ratio reducer in the radar system between the transmitter and the first antenna and the second antenna.

3. The radar system according to claim 1, wherein transmitted power is arranged in such a way that after equalization, pulse compression and one-sided beam forming the received signal energy from one resolution cell during the radar registration time at least equals the sum of external and internal noise energy divided with a time/bandwidth product.

4. The radar system according to claim 1, wherein flatness of the radar system transfer function is arranged by transmission of the known signal shape over the bandwidth, by arranging for the received signals for each channel to be convolved with an inverse impulse response function, thus obtaining a signal equalization for each channel, and by arranging a pulse compression by convolving the equalized signal for each channel with a conjugate transmit signal waveform thus obtaining a first equalized and compressed signal from the first receiver channel and a second equalized and compressed signal from the second receiver channel.

5. The radar system according to claim 1, further comprising:
    a reciprocal 4-port device arranged between the transmitter and said antennas in a configuration with:
    the reciprocal 4-port device having a first port connected to the first antenna via a first transmit/receive switch and a second port connected to the second antenna via a second transmit/receive switch,
    a waveform generator being connected to a third port of the reciprocal 4-port device via the transmitter,
    a load connected to a fourth port of the reciprocal 4-port device.

6. The radar system according to claim 5, wherein the radar system has a configuration of:
    the first antenna and the second antenna,
    a Transmit/Receive Switch connected to each antenna,
    the reciprocal 4-port device,
    the first receiver being connected to the first antenna via one of the transmit/receive switches in the first receiver channel and the second receiver being connected to the second antenna via the other transmit/receive switch in the second receiver channel,
    the receivers and an impulse response function-unit are connected to a first and a second convolution unit and the first convolution unit is connected to a first compression unit in the first receiver channel and the second convolution unit is connected to a second compression unit in the second receiver channel, the second receiver channel being in parallel to the first receiver channel, the compression units both being connected to a conjugate unit, and each compression unit is arranged to produce the equalized and compressed signal for their respective channels
    and/or
    wherein by the reciprocal 4-port device being a 90 degree hybrid both the voltage standing wave ratio reducer is realized and the phase difference $2\alpha$ is arranged to be substantially 90°.

7. The radar system according to 1, wherein the radar system is arranged to operate in a sub-band within the frequency range 20-500 MHz
    and/or
    wherein the wide bandwidth B of the frequency band is arranged to cover 1.6 octaves corresponding to the highest frequency in the frequency band being three times the lowest frequency in the frequency band.

8. The radar system according to claim 1, wherein said antennas have a length of approximately 1 m when the radar system is arranged to operate in a frequency band 27.5 MHz-82.5 MHz
    and/or
    wherein the transmit/receive switches, the reciprocal 4-port device, the waveform generator, the conjugate unit, the impulse response function-unit, the convolution units, phase shifters, the compression units and synthetic aperture radar signal processor all being signal processors.

9. A method for arranging a radar system for a synthetic aperture radar comprising an arrangement comprising at least one transmitter, two receivers, two antennas and a signal processor located on a platform moving over ground and transmitting a known signal shape and receiving signals reflected from the ground, the received signals being used to produce a synthetic aperture radar image of the ground, the synthetic aperture radar image comprising a number of resolution cells, and the radar system operating in a frequency band with a center frequency and with a wide bandwidth of at least one octave, wherein the radar system comprises a first and a second antenna having a length of less than half the wavelength of the center frequency and further by arranging:
    a radar system transfer function to be flat over the frequency band by equalizing and pulse compressing the received signals by the signal processing means and
    one-sided beam forming with wideband antenna gain, by utilizing a first receiver and a second receiver channel where the first receiver channel receives a signal from the first antenna and the second receiver channel receives a signal from the second antenna and further by matching antenna separation with a phase difference of 2α degrees between the transmit signals fed into each antenna, 2α being in the vicinity of 90 degrees.

10. The method according to claim 9, wherein a voltage standing wave ratio of the radar system is reduced by insertion of a voltage standing wave ratio reducer in the radar system between the transmitter and said antennas.

11. The method according to claim 9, wherein transmitted power is arranged in such a way that after equalization, pulse compression and one-sided beam forming the received signal energy from one resolution cell during the radar registration time at least equals the sum of external and internal noise energy divided with a time/bandwidth product.

12. The method according to claim 9, wherein a flatness of the radar system transfer function is arranged by transmission of the known signal shape over the bandwidth, by convolving the received signals for each channel with an inverse impulse response function, thus obtaining a signal equalization for each channel, and by pulse compressing by convolving the equalized signal for each channel with a conjugate transmit signal waveform thus obtaining a first equalized and compressed signal from the first receiver channel and a second equalized and compressed signal from the second receiver channel.

13. The method according to claim 9, wherein a reciprocal 4-port device is inserted between the transmitter and said antennas in a configuration with:
the reciprocal 4-port device having a first port connected to the first antenna via a first transmit/receive switch and a second port connected to the second antenna via the a second transmit/receive switch,
a waveform generator being connected to a third port of the reciprocal 4-port device via the transmitter, and
a load connected to a fourth port of the reciprocal 4-port device.

14. The method according to claim 13, wherein the radar system has a configuration of:
the first and the second antenna,
a transmit/receive switch connected to each antenna,
the reciprocal 4-port device,
the first receiver being connected to the first antenna via one of the transmit/receive switches in the first receiver channel and the second receiver being connected to the second antenna via the other transmit/receive switch in the second receiver channel,
the receivers and an impulse response function-unit are connected to a first convolution unit and a second convolution unit and the first convolution unit is connected to a first compression unit in the first receiver channel and the second convolution unit is connected to a second compression unit in the second receiver channel, the second receiver channel being in parallel to the first receiver channel, the compression units both being connected to a conjugate unit, and each compression unit is producing the equalized and compressed signal for their respective channels
and/or
wherein by the reciprocal 4-port device being a 90 degree hybrid both the voltage standing wave ratio reducer is realized and the phase difference 2α is arranged to be substantially 90°.

15. The method according to claim 9, wherein the radar system operates in a sub-band within the frequency range 20-500 MHz
and/or
wherein the wide bandwidth of the frequency band covers 1.6 octaves corresponding to the highest frequency in the frequency band being three times the lowest frequency in the frequency band.

16. The method according to claim 9, wherein said antennas have a length of approximately 1 m when the radar system is operating in a frequency band 27.5 MHz-82.5 MHz
and/or
wherein the transmit/receive switches, the reciprocal 4-port device, the waveform generator, the conjugate unit, the IRF-unit, the convolution units, phase shifters, the compression units and SAR signal processor all being signal processors.

* * * * *